R. W. BRYAN.
ENGINE CROSS HEAD.
APPLICATION FILED APR. 30, 1910.
987,853.
Patented Mar. 28, 1911.
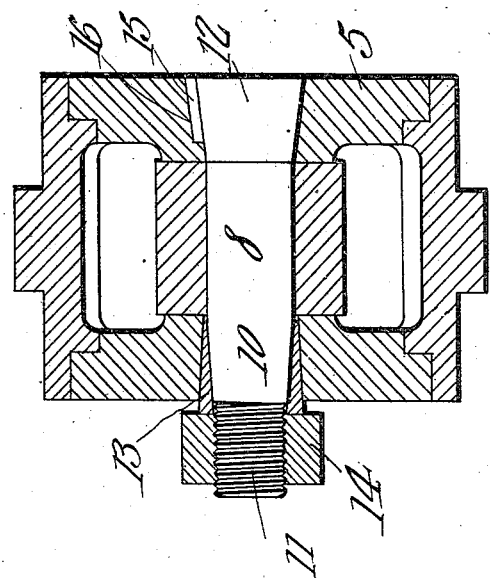
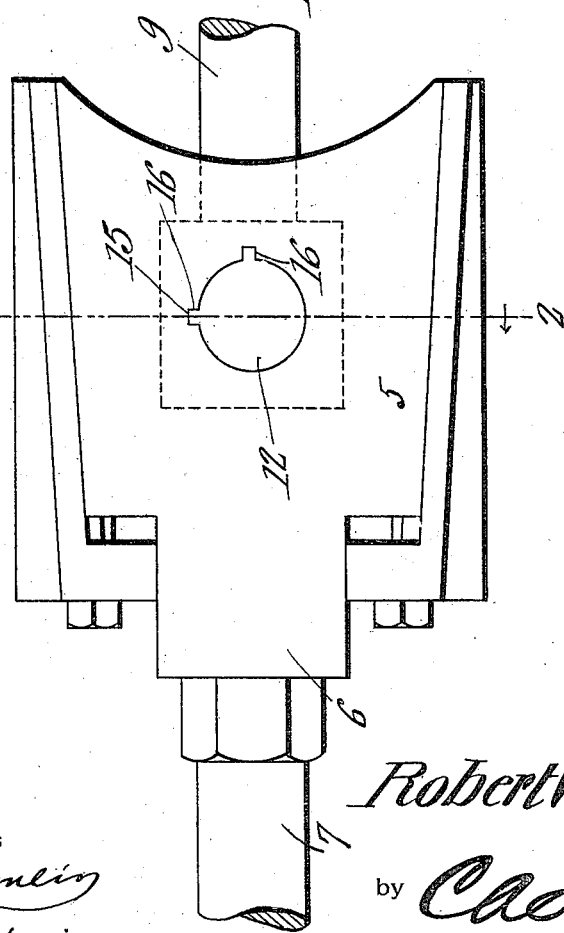
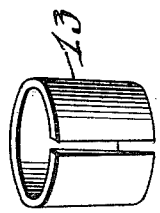
Robert W. Bryan,
Inventor

UNITED STATES PATENT OFFICE.

ROBERT W. BRYAN, OF ABERDEEN, WASHINGTON, ASSIGNOR OF ONE-HALF TO GEORGE B. REID, OF ABERDEEN, WASHINGTON.

ENGINE CROSS-HEAD.

987,853.   Specification of Letters Patent.   Patented Mar. 28, 1911.

Application filed April 30, 1910. Serial No. 558,558.

*To all whom it may concern:*

Be it known that I, ROBERT W. BRYAN, a citizen of the United States, residing at Aberdeen, in the county of Chehalis and State of Washington, have invented a new and useful Engine Cross-Head, of which the following is a specification.

This invention has reference to engine cross heads, and more particularly to the wrist pin thereof, the purpose of the invention being to provide a wrist pin which can be easily and securely set in place, or removed when necessary, and which is adjustable to take up wear.
In the accompanying drawing, Figure 1 is an elevation of a cross head provided with my improved wrist pin, and Fig. 2 is a transverse section on the line 2—2 of Fig. 1. Fig. 3 is a perspective view of the bushing hereinafter referred to.

The drawing shows an ordinary cross head 5 having at one end a boss 6 for attachment of the piston rod 7. Inasmuch as nothing is claimed for the cross head, a detailed description thereof is deemed unnecessary.

The wrist pin which is the subject of the present invention has a main cylindrical portion 8 which spans the opening in the cross head occupied by the box of the connecting rod 9, through which box said main portion of the pin passes. The cylindrical portion has at one end a tapered portion 10 terminating in a screw threaded portion 11, and has at its opposite end a head 12 which is turned tapering, and fits snugly in a correspondingly shaped opening in one side of the cross head. In the opposite end of the cross head is an opening through which the tapered portion 10 of the pin extends. This opening is tapered counter to the taper of the portion 10, so that there will be a space between the periphery thereof and the wall of the opening, in which space is placed a bushing 13, the inner surface of which is tapered to fit the tapered portion of the pin, and its outer surface is tapered to fit the wall of the opening. The bushing extends a short distance from the opening, so that a nut 14 screwed on the threaded portion 11 of the pin, may engage the end of said projecting portion of the bushing. The bushing is split as shown in Fig. 3, so that it may adjust itself as it is drawn into place when the nut is screwed up tight.

The head 12 is formed with a key 15 which is adapted to be seated in one or the other of a pair of key ways 16. These key ways are spaced 90 degrees apart, and as the wear on the pin is on opposite sides, a quarter turn of the pin brings the adjacent unworn side into use.

A pin constructed and arranged as herein described can be easily applied and removed, and it will not work loose. If wear takes place, the pin can be released, and given a quarter turn as described. If the bushing or the part which it engages wears, the nut may be tightened up, which pushes the bushing inwardly, and as it is split and tapered, it will automatically readjust itself to take up the wear. In view of these advantages, the pin and its associate parts effectually serve the purpose for which they are designed.

What is claimed is:

A cross head having in its opposite sides alined conical bores, the smaller ends of which are innermost, a split bushing, the inner and outer surfaces of which are tapered, said bushing being located in one of the conical bores of the cross head and having an end portion projecting beyond the outer portion of the side of the cross head, its other end lying flush with the inner face of the side of said cross head, a pin having an intermediate cylindrical portion which bridges the space between the opposite sides of the cross head and between which a connecting rod may be mounted, the pin having at one end of its cylindrical portion a conical head which fits snugly in the otherwise unoccupied bore of the head and which is restrained against rotation therein, the pin having at the other end of its cylindrical portion a conical portion which fits snugly in the bore of the bushing, and a nut screwed upon the projecting end of the pin and bearing against the projecting end of the bushing.

In testimony that I claim the foregoing as my own, I have hereto affixed my signature in the presence of two witnesses.

ROBERT W. BRYAN.

Witnesses:
ROBERT H. OLIVER,
GEORGE W. LAWRENCE.

Copies of this patent may be obtained for five cents each, by addressing the "Commissioner of Patents, Washington, D. C."